(12) United States Patent
Lee

(10) Patent No.: US 6,613,382 B1
(45) Date of Patent: Sep. 2, 2003

(54) METHOD OF MANUFACTURING A NOTE POSTER

(76) Inventor: Eunchang Lee, 21 Andalucia, Irvine, CA (US) 92614

( * ) Notice: Subject to any disclaimer, the term of this patent is extended or adjusted under 35 U.S.C. 154(b) by 283 days.

(21) Appl. No.: 09/746,926

(22) Filed: Dec. 22, 2000

(51) Int. Cl.[7] .................................................. B05D 5/10
(52) U.S. Cl. ................. 427/208; 427/208.4; 427/208.8; 427/209; 427/265; 427/289; 427/412.1; 427/430.1
(58) Field of Search .............................. 427/208, 208.4, 427/208.8, 209, 265, 289, 412.1, 430.1

(56) References Cited

U.S. PATENT DOCUMENTS

| | | | |
|---|---|---|---|
| 3,165,283 A | 1/1965 | Borisof | |
| 3,350,045 A | 10/1967 | Mayers | |
| 3,399,429 A | 9/1968 | Goodman | |
| 4,039,134 A | 8/1977 | Redmer | |
| 4,310,137 A | 1/1982 | Frye | |
| 4,478,384 A | 10/1984 | Julseth | |
| 4,756,498 A | 7/1988 | Frye | |
| 4,783,354 A | 11/1988 | Fagan | |
| 5,046,696 A | 9/1991 | Lee | |
| 5,102,714 A | 4/1992 | Mobley et al. | |
| 5,110,077 A | 5/1992 | Mossini | |
| 5,121,896 A | 6/1992 | Frye | |
| 5,275,367 A | 1/1994 | Frye | |
| 5,464,681 A | 11/1995 | Luce | |
| D419,192 S | 1/2000 | Huang | |

FOREIGN PATENT DOCUMENTS

DE    WO 97/01483    1/1997

Primary Examiner—Bernard Pianalto
(74) Attorney, Agent, or Firm—Eric Karich

(57) ABSTRACT

A method of manufacturing a plurality of note posters from a planar vinyl sheet having a printed surface and an opposing adhesive surface provides for first printing a plurality of images upon the printed surface. Once it has been printed, the planar vinyl sheet is laid in a horizontal position with the adhesive surface facing upwards, and a liquid polymer adhesive is poured onto the adhesive surface such that the liquid polymer adhesive spreads across and evenly covers the planar vinyl sheet to form a polymer adhesive layer. The planar vinyl sheet is then die-cut around each of the plurality of images, thereby forming the plurality of note posters. The polymer adhesive layer forms a tacky surface on each of the plurality of note posters useful for removably securing a paper note to a surface.

8 Claims, 2 Drawing Sheets

METHOD OF MANUFACTURING A NOTE POSTER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to note posters, and more particularly to a method for manufacturing a plurality of note posters having a polymer adhesive layer for removably attaching the note posters to a surface.

2. Description of Related Art

The following art defines the present state of this field:

Borisof, U.S. Pat. No. 3,165,283, teaches a removable and re-usable adhesive fastening device for holding posters, bulletins, decorations, and other similar articles on windows, walls, or any other surfaces.

Frye, U.S. Pat. No. 5,275,367, teaches a reusable self securing plastic holding device for mounting onto a smooth clean polished surface and having a particular physical arrangement which absorbs and dissipates the sheer forces exerted thereupon by a held object.

Julseth, U.S. Pat. No. 4,478,384, teaches a fastening device for securing paper sheets or cards to a rigid surface. The fastening device includes a transparent resilient rectangular plastic sheet with an adhesive strip along its upper edge and a frictional pad near, but spaced from, its lower edge, the pad being at least as thick as the adhesive strip.

Redmer, U.S. Pat. No. 4,039,134, teaches a message holder comprising a plastic housing having a sloping roof with a spring loaded ball detent thereunder.

R. Goodman, U.S. Pat. No. 3,399,429, teaches a clamping device for sheets such as papers, films, charts, and the like, comprising a support member which has a gravity-biased roller that is moved by gravity into a clamping position in an inclined guideway.

L. S. Mayers, U.S. Pat. No. 3,350,045, teaches a holding device for holding an article or group of articles, such as a plurality of papers, on any convenient surface, such as a wall or desk, and which provides a readily available article holder for papers and the like, which is easily transportable and movable and which can be fixedly positioned in place by application of a slight pressure.

Mossini, U.S. Pat. No. 5,110,077, teaches a member that includes a three dimensional rigid central part which functions to support an object, and a flexible peripheral part, suitably covered with adhesive, which acts as a surface of contact, and therefore an anchorage, with the wall.

Frye, U.S. Pat. No. 5,121,896, teaches a reusable self securing plastic holding device for mounting onto a clean smooth surface. The device has a structure which contributes substantial load bearing capacity in being particularly adapted to resist shear force or peel back.

Lee, U.S. Pat. No. 5,046,696, teaches a holder for eyeglasses which may accept the temple portion of an eyeglass frame for supporting the eyeglasses in a vertical position and which may be mounted on any surface.

Frye, U.S. Pat. No. 4,756,498 and U.S. Pat. No. 4,310,137, teaches a surface mounted article holding device adhesively attached to a supporting surface.

Mobley et al., U.S. Pat. No. 5,102,714, teaches a polyurethane adhesive prepared from a reaction mixture containing small amounts of chain extender material and a high equivalent weight of a polyol and a monoalcohol.

Luce, U.S. Pat. No. 5,464,681, teaches a replaceable adhesive display comprising a paper, metallized paper, or foil substrate printed on one or both sides with the same or different images, and at least one side is provided with a transparent overlay.

Fagan, U.S. Pat. No. 4,783,354, teaches a sheet material which can be firmly adhered to a surface, and yet readily removed therefrom, without the necessity of pre-wetting and without damaging the surface.

Huang, U.S. Des. Pat. No. 419,192, teaches an ornamental design for magnet memo clip and pen holder.

WO 97/01483, teaches an adhesive system for sticking all-round labels. The system includes a priming adhesive which is active while the label is applied and a covering adhesive for permanently sticking the label overlap.

The prior art teaches various devices that utilize an adhesive to removably attach an item to a surface. However, the prior art does not teach a method of manufacturing a plurality of note posters from a printed medium that has been printed with a plurality of images and attached to a polymer adhesive layer that allows the printed medium to be readily attached to the surface and removed without damaging the surface or leaving a sticky residue. The present invention fulfills these needs and provides further related advantages as described in the following summary.

SUMMARY OF THE INVENTION

The present invention teaches certain benefits in construction and use which give rise to the objectives described below.

The present invention provides a method of manufacturing a plurality of note posters, and a method for using one of the plurality of note posters to removably secure a paper note to a surface. The plurality of note posters are manufactured from a printed medium having a printed surface and an opposing adhesive surface. A plurality of images are printed upon the printed surface. Once it has been printed, the printed medium, preferably a planar vinyl sheet, is laid in a horizontal position with the adhesive surface facing upwards, and a liquid polymer adhesive is poured onto the adhesive surface such that the liquid polymer adhesive spreads across and evenly covers the planar vinyl sheet to form a polymer adhesive layer. The planar vinyl sheet is then die-cut around each of the plurality of images, thereby forming the plurality of note posters. The polymer adhesive layer forms a tacky surface on each of the plurality of note posters useful for removably securing a paper note to a surface.

A primary objective of the present invention is to provide a method of manufacturing a plurality of note posters, the method of manufacturing having advantages not taught by the prior art.

Another objective is to provide a note poster that provides both a printed surface and a tacky surface for removably attaching the note poster to a surface without damaging the surface when the note poster is removed, or leaving a sticky residue.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above described drawing figures illustrate the invention, a method of manufacturing a plurality of note posters 10, and a method for using one of the plurality of note posters 10 to removably secure a paper note 12 to a surface 14.

Figure 1:
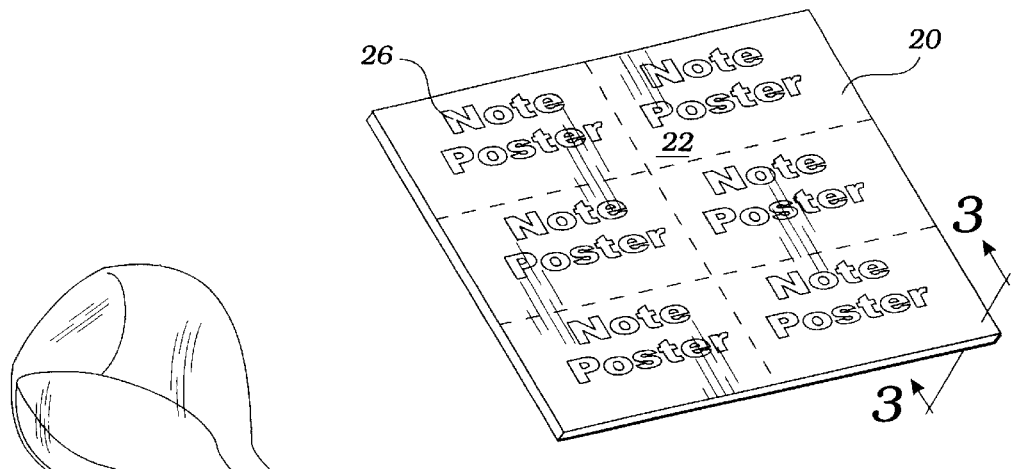
FIG. 1 is a top perspective view of a printed surface of a planar vinyl sheet before the a planar vinyl sheet has been cut into a plurality of note posters.

As shown in FIG. 1, the plurality of note posters 10 are manufactured from a printed medium 20 having a printed surface 22 and an opposing adhesive surface 24. The printed medium 20 is preferably a planar vinyl sheet 20, although equivalent materials such as plastic, paper, and other materials are also acceptable and within the scope of the claimed invention. A plurality of images 26 are printed upon the printed surface 22 using printing techniques, such as screen printing, that are well known in the art. To increase efficiency, the planar vinyl sheet 20 should be large and printed with many repeating copies of the printed image, so that the planar vinyl sheet 20 can be cut into the plurality of note posters 10 using a die or similar cutting mechanism. Each of the plurality of note posters 10 is preferably imprinted with the same image, typically a company logo or similar advertising. Each of the plurality of images 26 preferably includes advertising materials and contact information, to maximize the usefulness of the note poster 10 as an advertising venue.

Figure 2:
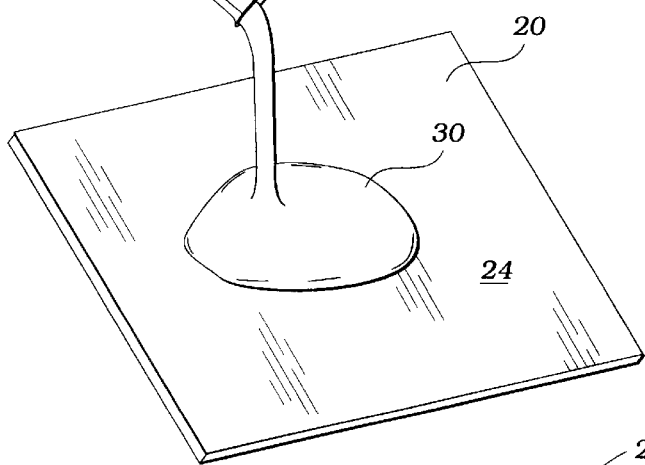
FIG. 2 is a bottom plan view thereof illustrating a liquid polymer adhesive being poured onto an adhesive surface of the planar vinyl sheet to form a polymer adhesive layer.

Once it has been printed, the planar vinyl sheet 20 is laid in a horizontal position with the adhesive surface 24 facing upwards, as shown in FIG. 2, and a liquid polymer adhesive 30 is poured onto the adhesive surface 24 such that the liquid polymer adhesive 30 spreads across and evenly covers the planar vinyl sheet 20 to form a polymer adhesive layer 32. The liquid polymer adhesive 30 is a polyurethane or a polyester, and is preferably similar in composition to Mobley et al., U.S. Pat. No. 5,102,714, which is hereby incorporated by reference. The polymer adhesive layer 32 provides a tacky surface 34 that can be readily peel-removed from the surface 14 without leaving a residue; and the polymer adhesive layer 32 can also be washed with water to remove dust and other contaminants to restore the tacky consistency of the polymer adhesive layer 32.

Figure 3:
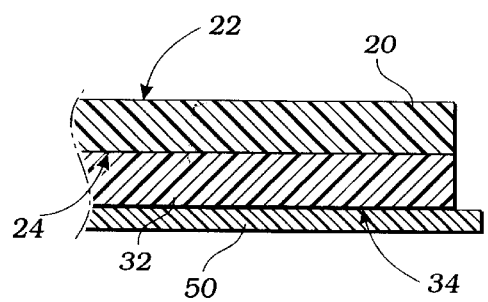
FIG. 3 is a sectional view thereof taken along line 3—3 in FIG. 1 once the polymer adhesive layer has polymerized.

As shown in FIG. 3, once the liquid polymer adhesive 30 is allowed to polymerize, it forms the polymer adhesive layer 32 which is permanently bonded with the adhesive surface 24 of the planar vinyl sheet 20 so that the polymer adhesive layer 32 cannot be removed from the planar vinyl sheet 20. The polymer adhesive layer 32 also forms a tacky surface 34 opposite the planar vinyl sheet 20. The tacky surface 34 can form a temporary, removable bond with the surface 14, and yet be readily peel-removed without harming the surface 14 or leaving a residue. The planar vinyl sheet 20 is then die-cut around each of the plurality of images 26, thereby forming the plurality of note posters 10.

Figure 4:
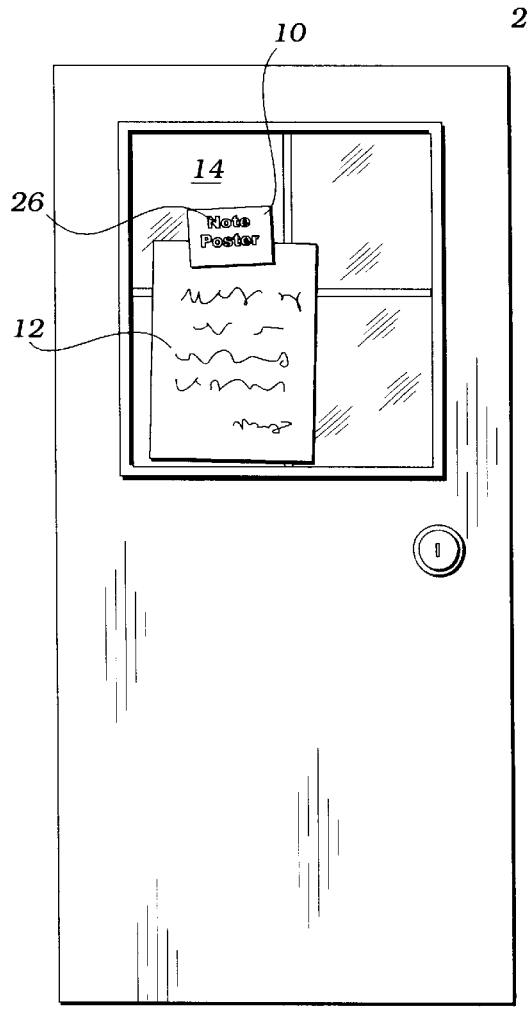
FIG. 4 is a top plan view of one of the plurality of note posters being used to removably attach a paper note to a surface.

As shown in FIG. 4, each of the plurality of note posters 10 is then used for removably securing a paper note 12 to a surface 14. One of the plurality of note posters 10, whose manufacture is described above, is positioned on the surface 14 overlapping the paper note 12. The tacky surface 34 removably sticks to both the paper note 12 and the surface 14, thereby allowing the paper note 12 to be removably secured to the surface 14. The paper note 12 can readily be moved or removed be peeling the note poster 10 from the surface 14; and if the note poster 10 ever becomes so dirty that it does not stick effectively, the note poster 10 can be washed in water to remove the dirt and restore the tackiness of the tacky surface 34.

Figure 5:
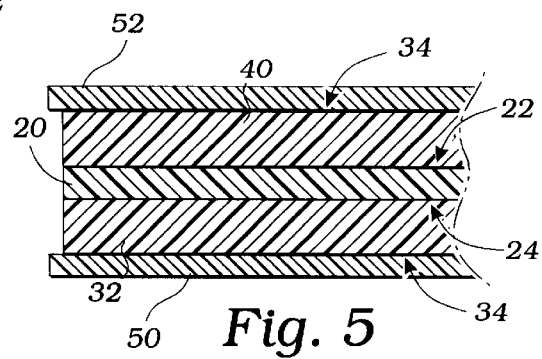
FIG. 5 is a sectional view similar to FIG. 3, but showing the addition of a second polymer adhesive layer.

In an alternative embodiment, as shown in FIG. 5, the planar vinyl sheet 20 is flipped after the polymer adhesive layer 32 has polymerized and a second polymer adhesive layer 40 is poured to cover the printed layer. The second polymer adhesive layer 40 is preferably transparent so that each of the plurality of images 26 can readily be seen through the second polymer adhesive layer 40.

Figure 6:
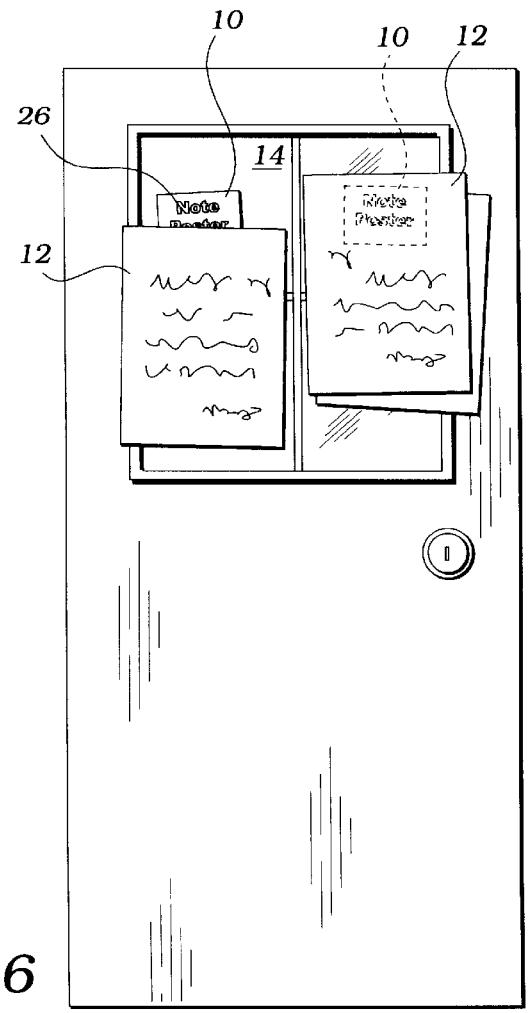
FIG. 6 is a top plan view of one of the plurality of note posters being used to removably attach the paper note to the second polymer adhesive layer.

As shown in FIG. 6, each of the plurality of note posters 10 is removably attached to the surface 14 with the polymer adhesive layer 32; and the paper note 12 is removably attached to the note poster 10 with the second polymer adhesive layer 40. This provides an excellent tool for removably mounting the paper note 12 onto the surface 14. As described above, despite the presence of the second polymer adhesive layer 40, the printed surface 22 still retains its ability of display each of the plurality of images 26.

To facilitate the transport and storage of each of the plurality of note posters 10, the tacky surface 34 of the polymer adhesive layer 32 is preferably covered with a release liner 50. The second polymer adhesive layer 40 is preferably covered with a second release liner 52. The release liner and the second release liner 52 are preferably constructed of wax paper or a similar material that can be peel-removed from the polymer adhesive layer 32 and the second polymer adhesive layer 40, respectively, to expose the adhesive for use.

While the invention has been described with reference to at least one preferred embodiment, it is to be clearly understood by those skilled in the art that the invention is not limited thereto Rather, the scope of the invention is to be interpreted only in conjunction with the appended claims.

What is claimed is:

1. A method of manufacturing a plurality of note posters, the method comprising the steps of:

a) providing a planar vinyl sheet having a printed surface and an opposing adhesive surface;

b) printing a plurality of images upon the printed surface;

c) lying the planar vinyl sheet in a horizontal position with the adhesive surface facing upwards;

d) pouring a liquid polymer adhesive onto the adhesive surface such that the liquid polymer adhesive spreads across and covers the planar vinyl sheet;

e) allowing the liquid polymer adhesive to polymerize, thereby forming a polymer adhesive layer having a permanent bond with the adhesive surface of the planar vinyl sheet, the polymer adhesive layer having a tacky surface opposite the planar vinyl sheet; and f) cutting the planar vinyl sheet around each of the plurality of images, thereby forming the plurality of note posters.

2. The method of manufacturing of claim 1 wherein the liquid polymer adhesive is a polyurethane.

3. The method of manufacturing of claim 1 wherein the liquid polymer adhesive is a polyester.

4. The method of manufacturing of claim 1 further comprising the steps of:

flipping the planar vinyl sheet, once the polymer adhesive layer has formed; and pouring the liquid polymer adhesive onto the printed surface to form a second polymer adhesive layer.

5. The method of manufacturing of claim 4 wherein the second polymer adhesive layer is transparent.

6. A method of manufacturing a plurality of note posters, the method comprising the steps of:

a) providing a printed medium having a printed surface and an opposing adhesive surface, b) printing a plurality of images upon the printed surface;

c) lying the printed medium in a horizontal position with the adhesive surface facing upwards;

d) pouring a liquid polymer adhesive onto the adhesive surface such that the liquid polymer adhesive spreads across and covers the printed medium;

e) allowing the liquid polymer adhesive to polymerize, thereby forming a polymer adhesive layer having a permanent bond with the adhesive surface of the printed medium, the polymer adhesive layer having a tacky surface opposite the printed medium, and f) cutting the printed medium around each of the plurality of images, thereby forming the plurality of note posters.

7. The method of manufacturing of claim 6 wherein the liquid polymer adhesive is a polyurethane.

8. The method of manufacturing of claim 6 wherein the liquid polymer adhesive is a polyester.

\* \* \* \* \*